June 21, 1966 R. H. J. FIÉVET 3,256,970
WORK STATION CONVEYOR
Filed Dec. 22, 1964 2 Sheets-Sheet 2
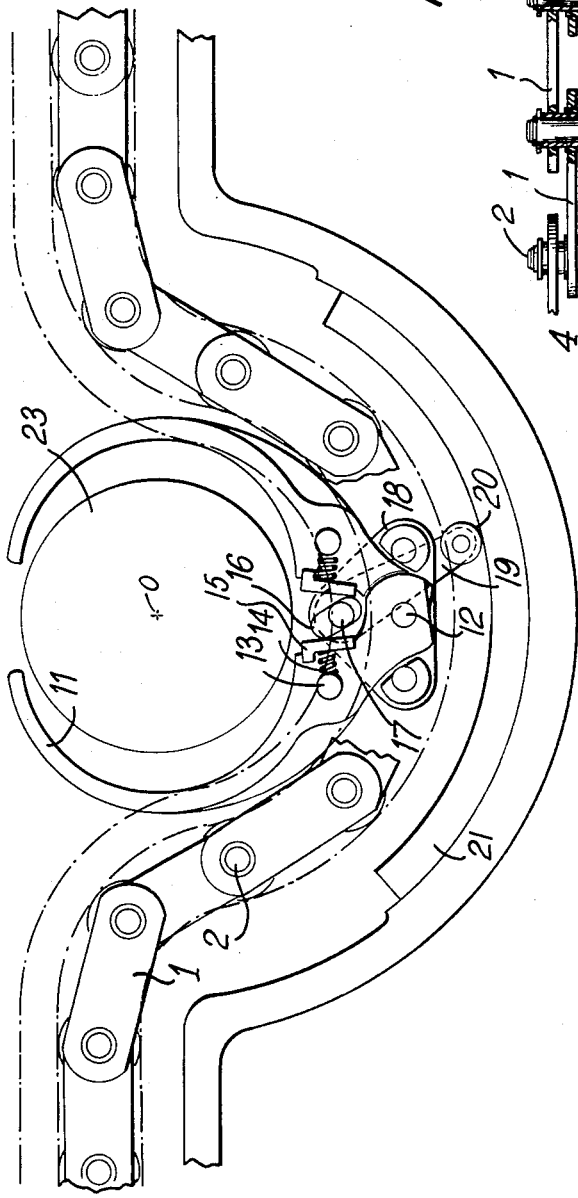
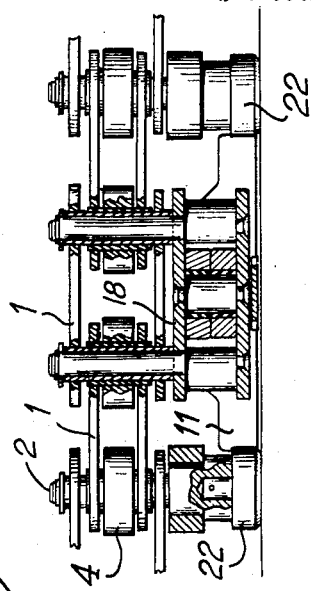
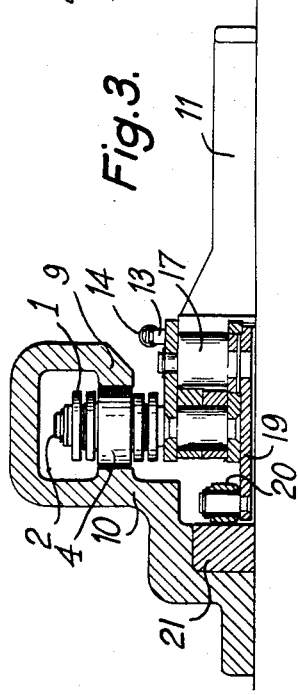

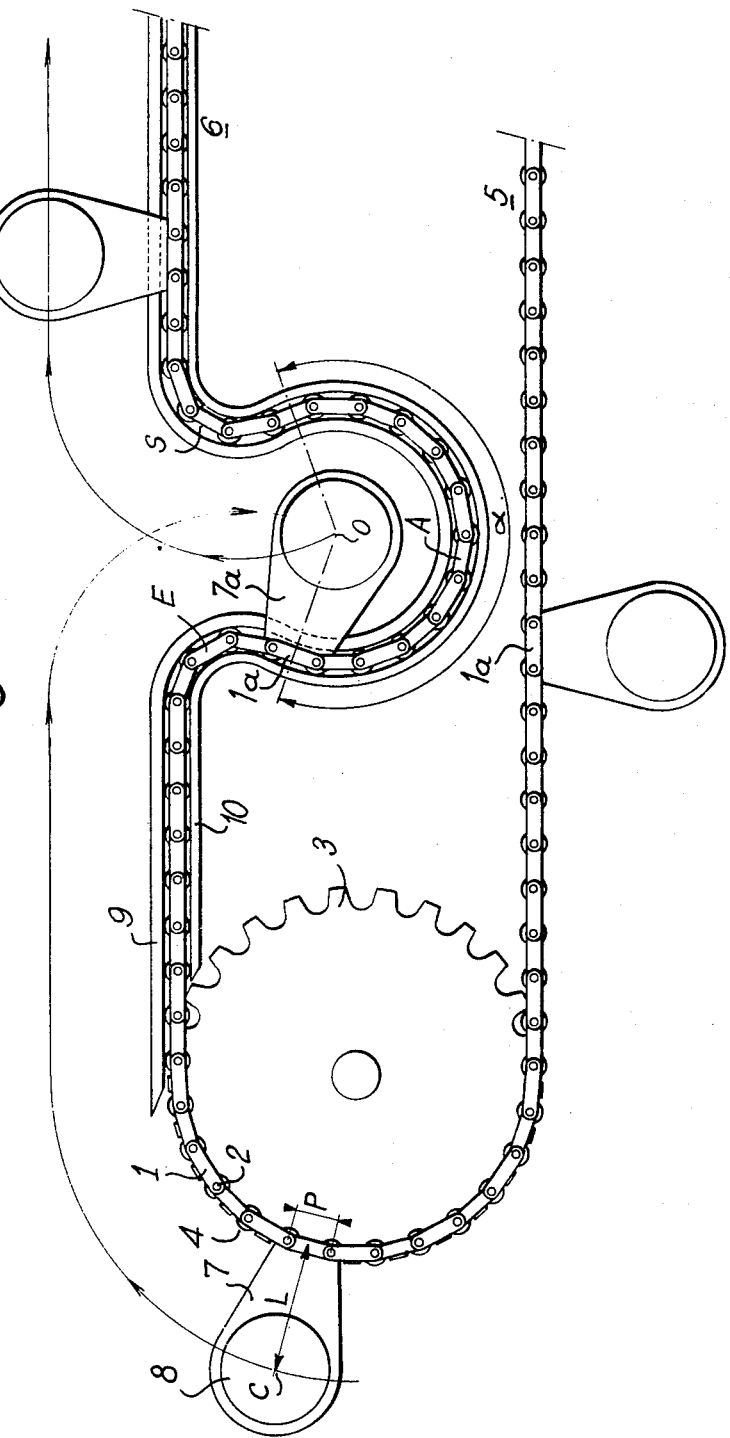

3,256,970
WORK STATION CONVEYOR
Robert Henri Jules Fiévet, Paris, France, assignor to
Fromageries Bel-La Vache Qui Rit, Paris, France
Filed Dec. 22, 1964, Ser. No. 420,402
Claims priority, application France, Jan. 6, 1964,
959,392, Patent 1,389,549
6 Claims. (Cl. 198—19)

It is often necessary in industry to be able to momentarily halt the motion of objects conveyed by a transfer chain in parallelism therewith, in order to perform operations that would otherwise be too delicate or too complex to carry out on the objects as they are borne along by the moving chain. It is therefore customary for the chain to be halted when a transferred object reaches an operating station.

The present invention has for main object to permit the performance of operations, in predetermined fixed positions, on objects transferred by a continuously moving chain, without halting the latter, and accordingly to provide an apparatus with continuously travelling transfer chain and with stations for momentarily halting the translation of the objects conveyed by said chain, characterized in that it comprises an endless chain fitted at intervals of several links with bearer members which have circular locations thereon for the conveyed objects and which are mounted as outriggers on a single attachment link, each chain run following a substantially straight path joining through entry and exit curves level with each halting station, into an arc of a circle the radius of which is equal to the distance of the center of said location from one of the axes of said attachment link and the concavity of which is directed toward the bearer members of that chain run, the interval between two consecutive attachment links being greater than the sum of the lengths of said curves and said arc.

Thus, when the attachment link of the bearer member describes such a circumferential arc, the center of the corresponding circular location on said member remains fixed in space and the object or objects arranged in predetermined fashion thereon can undergo any desired operation.

Should the operation to be performed on the object require the use of apparatus which is fixed in relation to the center of said circumferential arc, the bearer member may comprise with advantage a clamp for positioning the supported object upon the center of the circular location, said clamp being caused to be opened by any convenient means as the corresponding attachment link follows said circumferential arc.

The present invention further encompasses industrial applications of the apparatus hereinbefore specified, and more particularly those in which the halting stations are used for weighing, verification and labelling operations, most notably on clustered and packaged cheese portions.

The description which follows with reference to the accompanying non-limitative exemplary drawings will give a clear understanding of how the invention can be carried into practice.

In the drawings:

FIG. 1 schematically represents an apparatus according to the invention, with a transfer chain and a station for momentarily halting the conveyed objects;

FIG. 2 shows in plan view, on an enlarged scale, a halting station for an apparatus equipped with a clamp for supporting cylindrically shaped objects to be transferred;

FIG. 3 shows the clamp of FIG. 2 in vertical section, in the position it occupies as its attachment link enters the circumferential arc of the halting station; and FIG. 4 shows in side elevation with partial cutaway the clamp of FIG. 2 and the associated slippers thereof.

Referring first to FIG. 1, the apparatus shown thereon comprises a conventional endless chain with links 1 pivotally interconnected by pins 2 and driven at constant linear speed by a driving sprocket 3 engaging with rollers 4 carried by said pins. Each run 5 and 6 of this chain follows a substantially straight path. At intervals of several links, one chain link has affixed thereto a bearer member 7 provided with a circular location 8 for the objects to be conveyed, and the center C of this circular location is at a distance L from the axis of the link, the length of the link being equal to P, i.e. to the chain pitch.

At each momentary halting station provided for the objects placed on the circular location 8, the corresponding chain run (the run 6 in the specific example of FIG. 1) is constrained by an external guide 9 and an internal guide 10 to follow an arc or a circle A the radius of which is given by the relation:

$$R = \sqrt{\frac{P^2}{4} + L^2}$$

This arc blends into the general straight path of this chain run through an entry curve E and an exit curve S. It should be noted that the external guide 9 may be dispensed with since the tension in the chain applies the rollers against the internal guide 10 over the arcuate portion thereof under the effect of centrifugal force.

It will readily be appreciated that when the bearer member occupies the position 7a of FIG. 1, in which the middle of the corresponding attachment link 1a has reached the start of the precedingly defined circumferential arc A of angular aperture α, the center C of its circular location will coincide with the center O of this arc and continue to do so until the middle of the link 1a has reached the exit point of said circumferential arc. The position defined thus by the center O is therefore one of momentarily halted translation of the object or objects conveyed by the member 7a, with respect to the continuously travelling chain.

Hence if it be necessary to perform at this halting station certain operations on the conveyed objects by means of equipment centered upon O and driven thereabout at an angular velocity equal to the speed at which the chain travels along said circumferential arc A, it will clearly be possible to carry out these operations in a position which is stationary with respect to the continuously travelling chain.

Conversely, should it be required that the objects which are then stationary with respect to the chain remain fixed in space in order to undergo operations performed by equipment which is itself fixed in space, then the bearer member may be devised as shown in FIGS. 2 and 3 for transferring circularly clustered cheese portions.

The bearer member accordingly comprises a clamp with two jaws 11 encircling its circular location (see FIGS. 2 and 3), which are pivotally connected to a common shaft 12 supported by the corresponding attachment link and which are respectively provided with an abutment 13 against which bears a spring 14 urging a follower 15 against a cam 16. This cam is supported on a shaft 17 rigid with a part 18 secured to the attachment link pins 2. To the shaft 17 is additionally fixed a lever 19 fitted with a roller 20 adapted to ride over the internal guide 10 and, for following the circumferential arc A, over a ramp 21 centered upon O.

Vertical support for the assembly is provided by slippers 22 (see FIG. 4) slipping over the apparatus frame, said slippers are fixed respectively ahead of and past the attachment link 1 of the clamp 11 and supported by the pin 2 of the corresponding link.

The apparatus hereinbefore described functions in the following manner:

The circularly clustered cheese portions 23 (see FIG. 2), rigidly united with the bearer member consisting of said clamp, follow an axis parallel with the chain roller axis over the straight parts of the chain path, at a constant speed equal to the translation speed of the chain. When the attachment link follows the entry curve E, the travel rate of the cheese portions is modulated, involving an initial acceleration followed by a deceleration down to zero speed when their mutual center merges with the center O of the circumferential arc A.

Because the link pitch P covers a determinate angular development of said arc, coincidence of the center of the clustered cheese portions with the center O upon entry into the arc A will take place only after the attachment link has covered half said angular development. Similarly, such coincidence will cease once that same link has covered half that same angular development in the course of its exit from the arc A.

Since the jaws 11 must free the clustered portions when the mutual center thereof coincides with the center O, they must be opened only when such coincidence is achieved. Consequently, the opening of the jaws responsively to the cam 16 controlled by the roller 20 riding over the ramp 21 similarly requires the covering of a certain angular distance by the attachment link. This likewise applies in respect of closure of the jaws. As a result, the cheese portions are centered upon the center O yet freely movable within said location while the clamp attachment link covers an angle less than $\alpha$.

The cheese portions kept stationary in this way can then be subjected to any desired operation with the aid of equipment stationary relative to the center O, examples of such equipment being means for weighing, checking, or labelling the clustered cheese portions.

After the jaws 11 have closed and gripped the clustered portions anew, the latter undergo the same speed modulation process in reverse as the attachment link travels along the exit curve S, and subsequently revert to their uniform speed along the straight part of the chain path.

What I claim is:

1. An apparatus with continuously travelling transfer chain and with stations for momentarily halting the translation of the objects conveyed by said chain comprising, in combination, an endless chain having a plurality of links, pins interconnecting said links, bearer members having circular locations thereon for the conveyed objects and secured laterally with respect to said chain on the pins of attachment links which are disposed at intervals of several links between each other, and, at each momentary halting station, external and internal guides between which said chain travels, said guides defining for said chain a path comprising a central arc of a circle which is connected to the general path of said chain through entry and exit curves, said arc of a circle having a radius equal to the distance of the center of said location from one of the pins of the corresponding attachment link while the concavity thereof is directed toward the bearer members secured on the corresponding run of the chain, the interval between two successive attachment links being greater than the sum of the lengths of said curves and of said arc.

2. An apparatus according to claim 1, wherein each bearer member consists of a single member supporting the objects, whereby said apparatus may be equipped at each momentary halting station with means for performing operations on the conveyed objects and which are centered upon the center of the arc of a circle and driven thereabout at an angular velocity equal to the rate of travel of the chain along said arc.

3. An apparatus according to claim 1, wherein each bearer member comprises circular clamping means centered upon the center of the corresponding circular location for clamping the conveyed objects, means for opening said clamping means, and means for controlling said opening means while the corresponding attachment link follows the arc of a circle, whereby said apparatus may be equipped at each momentary halting station with fixed means for performing operations on the conveyed objects.

4. An apparatus with continuously travelling transfer chain and with stations for momentarily halting the translation of the objects conveyed by said chain comprising, in combination, an endless chain having a plurality of links, pins interconnecting said links, bearer members having circular locations thereon for the conveyed objects and secured laterally with respect to said chain on the pins of attachment links which are disposed at intervals of several links between each other, each bearer member comprising circular clamping means centered upon the center of the corresponding circular location for clamping the conveyed objects and means for opening said clamping means, at each momentary halting station, external and internal guides between which said chain travels, said guides defining for said chain a path comprising a central arc of a circle which is connected to the general path of said chain through entry and exit curves, and means for controlling said opening means while the corresponding attachment link follows said arc of a circle, said arc of a circle having a radius equal to the distance of the center of said location from one of the pins of the corresponding attachment link while the concavity thereof is directed toward the bearer members secured on the corresponding run of the chain, the interval between two successive attachment links being greater than the sum of the lengths of said curves and of said arc.

5. An apparatus according to claim 4, wherein the clamping, opening and controlling means comprise, for each bearer member, a clamp having two jaws encircling in their closed position the circular location of said bearer, a shaft carried by the corresponding attachment link and on which said jaws are articulated, two abutments respectively mounted on said jaws, two followers respectively carried by said jaws, two springs interposed between said abutments and said followers, a cam engaging said followers, a second shaft rigidly connected to said attachment link and on which said cam is mounted, a lever fixed on said second shaft, a circular ramp mounted on the inside of the internal guide, centered upon the center of the arc of a circle and having an arcuate length slightly less than that of said arc, a roller pivotally mounted on said lever and engaging said ramp, and means for vertically supporting said attachment link.

6. An apparatus according to claim 5, wherein the means for vertically supporting the attachment link comprises two slippers adapted to slip on the frame of the apparatus and fixed respectively on the lower part of the other pins of the preceding and following links.

References Cited by the Examiner
UNITED STATES PATENTS

| | | |
|---|---|---|
| 1,116,406 | 11/1914 | Fleischer. |
| 2,830,712 | 4/1958 | Sykokis _____ 198—179 X |
| 3,204,756 | 9/1965 | Lesch _____ 198—19 X |

EVON C. BLUNK, *Primary Examiner.*

ROBERT J. HICKEY, *Examiner.*